United States Patent
Howarth

(10) Patent No.: US 9,175,671 B2
(45) Date of Patent: Nov. 3, 2015

(54) SMA ACTUATION APPARATUS

(71) Applicant: CAMBRIDGE MECHATRONICS LIMITED, Cambridge, Cambridgeshire (GB)

(72) Inventor: James Howarth, Cambridge (GB)

(73) Assignee: CAMBRIDGE MECHATRONICS LIMITED, Cambridge, Cambridgeshire (GB)

( * ) Notice: Subject to any disclaimer, the term of this patent is extended or adjusted under 35 U.S.C. 154(b) by 0 days.

(21) Appl. No.: 14/391,082

(22) PCT Filed: Apr. 12, 2013

(86) PCT No.: PCT/GB2013/050950
§ 371 (c)(1),
(2) Date: Oct. 7, 2014

(87) PCT Pub. No.: WO2013/153400
PCT Pub. Date: Oct. 17, 2013

(65) Prior Publication Data
US 2015/0113974 A1  Apr. 30, 2015

(30) Foreign Application Priority Data
Apr. 12, 2012 (GB) .................................. 1206490.3

(51) Int. Cl.
*F03G 7/06* (2006.01)
*G02B 7/04* (2006.01)
*G03B 17/00* (2006.01)
*H04N 5/225* (2006.01)
(Continued)

(52) U.S. Cl.
CPC *F03G 7/065* (2013.01); *G02B 7/08* (2013.01); *G02B 27/646* (2013.01); *G03B 5/00* (2013.01); *G03B 2205/0015* (2013.01)

(58) Field of Classification Search
CPC ............. G03B 5/00; G03B 2205/0007; G03B 2205/0015; G03B 2205/0038; H04N 5/23248; H04N 5/23287; G02B 7/08; G02B 27/646; F03G 7/065
See application file for complete search history.

(56) References Cited

U.S. PATENT DOCUMENTS

| 4,932,210 A | 6/1990 | Julien et al. |
| 5,279,123 A | 1/1994 | Wechsler et al. |

(Continued)

FOREIGN PATENT DOCUMENTS

| CN | 202077117 U | 12/2011 |
| EP | 2813877 A1 | 12/2014 |

(Continued)

*Primary Examiner* — William B Perkey
(74) *Attorney, Agent, or Firm* — Harness, Dickey & Pierce, P.L.C.

(57) ABSTRACT

An SMA actuation apparatus moves a movable element, such as a camera lens element, relative to a support structure in any direction perpendicular to a notional primary axis using N pairs of SMA actuator wires extending perpendicular to said primary axis, where N is three or more. The SMA actuator wires of each pair extend parallel to each other and being connected at their ends in tension to the movable element and the support structure in opposition to apply a force to the movable element in opposite directions. The SMA actuator wires are arranged around the movable element such that they are capable of being selectively driven to move the movable element in any direction perpendicular to said primary axis. Accordingly, it is possible to drive movement with an apparatus that is compact along the primary axis.

15 Claims, 3 Drawing Sheets

(51) Int. Cl.
*G02B 27/64* (2006.01)
*G02B 7/08* (2006.01)
*G03B 5/00* (2006.01)

(56) References Cited

U.S. PATENT DOCUMENTS

| | | | |
|---|---|---|---|
| 8,559,803 B2 | 10/2013 | Huang et al. | |
| 2001/0022688 A1* | 9/2001 | Kosaka et al. | 359/557 |
| 2003/0079472 A1* | 5/2003 | Hara et al. | 60/527 |
| 2006/0150627 A1 | 7/2006 | Oohara | |
| 2007/0103555 A1* | 5/2007 | Eromaki | 348/208.4 |
| 2007/0109412 A1 | 5/2007 | Hara | |
| 2010/0228362 A1* | 9/2010 | Pathak et al. | 623/65 |
| 2010/0265343 A1 | 10/2010 | Lee et al. | |
| 2011/0091193 A1* | 4/2011 | Lim et al. | 396/133 |
| 2012/0251088 A1 | 10/2012 | Huang et al. | |
| 2015/0113974 A1* | 4/2015 | Howarth | 60/527 |
| 2015/0135703 A1* | 5/2015 | Eddington et al. | 7/6 |

FOREIGN PATENT DOCUMENTS

| | | | |
|---|---|---|---|
| WO | WO-2007113478 A1 | 10/2007 | |
| WO | WO-2010/029316 A2 | 3/2010 | |
| WO | WO-2010/089529 A1 | 8/2010 | |
| WO | WO-2011/104518 A1 | 9/2011 | |
| WO | WO-2012066285 A1 | 5/2012 | |
| WO | WO-2013/118601 A1 | 8/2013 | |
| WO | WO 2013/121225 A1 * | 8/2013 | G03B 5/00 |
| WO | WO-2013175197 A1 | 11/2013 | |

* cited by examiner

SMA ACTUATION APPARATUS

CROSS-REFERENCE TO RELATED APPLICATIONS

This application is a 371 U.S. National Stage of International Application No. PCT/GB2013/050950, filed Apr. 12, 2013, which claims priority from British Patent Application No. 1206490.3, filed Apr. 12, 2012. The entire disclosures of the above applications are incorporated by reference herein.

The present invention relates to the use of SMA (shape memory alloy) actuator wires to provide positional control of a movable element supported on a support structure.

There are a variety of types of apparatus in which it is desired to provide positional control of a movable element. SMA actuator wire is advantageous as an actuator in such an apparatus, in particular due to its high energy density which means that the SMA actuator required to apply a given force is of relatively small size.

One type of apparatus in which SMA actuator wire is known for use as an actuator is a camera, particularly a miniature camera. Some examples are as follows. WO-2007/113478 discloses an SMA actuation apparatus in which SMA actuator wire is used to drive movement of a camera lens element along the optical axis, for example for the purpose of focussing an image formed by the camera lens element on an image sensor. WO-2010/029316 and WO-2010/089529 each disclose an SMA actuation apparatus in which SMA actuator wire is used to drive to provide optical image stabilisation (OIS) in a camera by driving tilting of a camera unit including a camera lens element and an image sensor. The tilting is controlled to stabilise the image formed by the camera lens element on an image sensor against vibration, typically caused by user hand movement, that degrades the quality of the image captured by the image sensor. WO-2011/104518 discloses an SMA actuation apparatus in which SMA actuator wire is used to drive to provide OIS in a camera by driving tilting of a camera unit, but with additional degrees of freedom.

The present invention is concerned with an SMA actuation apparatus for moving a movable element relative to a support structure in any direction perpendicular to a notional primary axis.

According to the present invention, there is provided an SMA actuation apparatus for moving a movable element relative to a support structure in any direction perpendicular to a notional primary axis, the SMA actuation apparatus comprising:

a support structure;

a movable element supported on the support structure in a manner allowing movement of the movable element relative to the support structure in any direction perpendicular to said primary axis; and N pairs of SMA actuator wires extending perpendicular to said primary axis, where N is three or more, the SMA actuator wires of each pair extending parallel to each other and being connected at their ends in tension to the movable element and the support structure in opposition so that they apply a force to the movable element in opposite directions, the pairs of SMA actuator wires being arranged around the movable element such that they are capable of being selectively driven to move the movable element in any direction perpendicular to said primary axis.

This SMA actuation apparatus is capable of moving a movable element relative to a support structure in any direction perpendicular to a notional primary axis, using an arrangement of SMA actuator wires that provides a number of advantages.

As a result of the arrangement around the primary axis in which projections of the four SMA actuator wires onto a notional plane perpendicular to the primary axis have four-fold rotational symmetry, the SMA actuator wires are capable of driving movement of the movable element in any direction perpendicular to said primary axis by selective actuation of the SMA actuator wires. Since the SMA actuator wires of each pair extend parallel to each other and are connected to the movable element and the support structure in opposition, they apply a force to the movable element in opposite directions. This allows each pair of SMA actuator wires to drive movement in both directions along an axis parallel to their extent by differential actuation of the SMA actuator wires of the pair. Thus the provision of three or more pairs of SMA actuator wires allows movement to be driven in any direction in two dimensions.

This is achieved whilst minimising the height of the SMA actuator apparatus in the direction of the primary axis, that is perpendicular to the direction of movement of the movable element. This is because the SMA actuator wires may be arranged parallel to the direction of movement, or else at a small angle thereto, such that the SMA actuator wires have a small extent along the primary axis.

The provision of three or more pairs of SMA actuator wires also allows the stress in the SMA actuator wires to be controlled by appropriate driving. For example in one embodiment, the SMA actuator wires may be driven to provide no net component of torque around the primary axis, thereby reducing the tendency for the movable element to rotate around the primary axis. Such reduction or balancing of torques around the primary axis may reduce the constraints on a suspension system if provided, or may avoid the need for a suspension system so that the movable element is supported by the SMA actuator wires themselves.

To simplify the packaging of the actuation arrangement, in some embodiments the pairs of SMA actuator wires may be arranged around the outside of the movable element and/or the pairs of SMA actuator wires extend transverse to respective notional radii extending from the primary axis.

The driving of the SMA actuator wires may be simplified by arranging the pairs of SMA actuator wires in an appropriate geometric arrangement. Particular advantage is achieved by arranging the SMA actuator wires around the movable element with N-fold rotational symmetry as viewed along the primary axis.

In one advantageous arrangement N is four. In that case the pairs of SMA wires can be arranged around the movable element in a straightforward manner.

In one example, the SMA actuation apparatus may be used to provide a camera with OIS. In this example, the SMA actuation apparatus is a camera apparatus further comprising an image sensor fixed to the support structure, and the movable element comprises a camera lens element comprising one or more lenses arranged to focus an image on the image sensor. The SMA actuation apparatus is arranged so that the primary axis is the optical axis of the camera lens element. The SMA actuation apparatus may then provide OIS by movement of the camera element laterally of the optical axis, which may be referred to as "shift" or "OIS-shift". This is advantageous as it reduces the overall size as compared to a camera in which OIS is provided by tilting of a camera unit including a camera lens element and an image sensor, wherein the camera needs sufficient clearances to accommodate movement of the entire camera unit. The advantages are particularly beneficial in a miniature camera, for example wherein the one or more lenses have a diameter of at most 10 mm.

In order to provide OIS, the SMA actuation apparatus may further comprise: a vibration sensor arranged to generate output signals representative of the vibration of the apparatus; and a control circuit arranged to generate drive signals for the SMA actuator wires in response to the output signals of the vibration sensor for stabilising the image sensed by the image sensor, and to supply the generated drive signals to the SMA actuator wires.

To allow better understanding, an embodiment of the present invention will now be described by way of non-limitative example with reference to the accompanying drawings. In the drawings.

Figure 1:
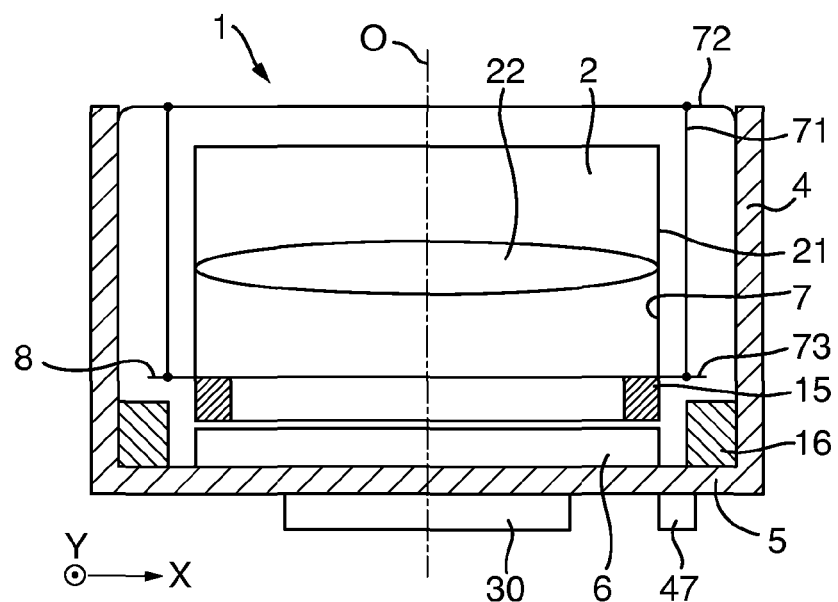
FIG. 1 is a schematic cross-sectional view of a camera apparatus.

A camera apparatus 1 that is an example of an SMA actuation apparatus in accordance with the present invention is shown in FIG. 1, which is a cross-sectional view taken along the optical axis O which is a notional, primary axis. In order to clearly describe the main parts of the camera apparatus 1, the SMA actuator wires are not shown in FIG. 1, but subsequently described with reference to FIG. 3. The camera apparatus 1 is to be incorporated in a portable electronic device such as a mobile telephone, media player or portable digital assistant. Thus miniaturisation is an important design criterion.

The camera apparatus 1 comprises a lens element 2 supported on a support structure 4 by a suspension system 7, described in detail below, in a manner allowing movement of the lens element 2 relative to the support structure 4 in any direction perpendicular to the optical axis O, that may have components along axes X and Y perpendicular to O and so forming a system of orthogonal axes X, Y and O. The suspension system 7 also resists movement along the optical axis O. Thus, the lens element 2 is a movable element.

The support structure 4 is a camera support supporting an image sensor 6 on the front side of the base 5 thereof. On the rear side of the base 5 there is mounted an IC (integrated circuit) chip 30 in which the control circuit 40 is implemented, and also a gyroscope sensor 47.

The lens element 2 comprises a lens carrier 21 in the form of a cylindrical body supporting a lens 22 arranged along the optical axis O, although in general any number of lenses 22 may be provided. The camera apparatus 1 is a miniature camera in which the lens 22 (or lenses 22 if plural lenses are provided) has a diameter of at most 10 mm.

The lens element 2 is arranged to focus an image onto the image sensor 6. The image sensor 6 captures the image and may be of any suitable type, for example a CCD (charge-coupled device) or a CMOS (complimentary metal-oxide-semiconductor) device.

The lens 22 (or lenses 22 if plural lenses are provided) may be fixed relative to the lens carrier 21, or alternatively may be supported on the lens carrier in a manner in which the lens 22 (or at least one lens 22 if plural lenses are provided) is movable along the optical axis O, for example to provide focussing. Where the lens 22 is movable along the optical axis O, a suitable actuation system (not shown) may be provided, for example using a voice coil motor, or an SMA actuator arrangement such as is described in WO-2007/113478.

In operation, the lens element 2 is moved orthogonally to the optical axis O in any direction, that may have components along axes X and Y, relative to the image sensor 6. This movement has the effect that the image on the image sensor 6 is moved. This is used to provide OIS, compensating for image movement of the camera apparatus 1, caused by for example hand shake.

In many known arrangements using SMA actuator wire to provide an OIS function, for example as disclosed in WO-2010/029316 and WO-2010/089529, the OIS is provided by tilting the entire camera unit including the lens element and the image sensor, substantially as a rigid body. This method of compensating for user handshake does in principle give the best OIS performance, because aligning the lens element to the image sensor is difficult in miniature cameras and the manufacturing tolerances are very tight. In addition, the user handshake being compensated for is essentially a tilt to the camera, and so it makes intuitive sense that the compensation should also tilt the camera. However, in this example, OIS is performed differently in order to mitigate several other problems.

The first problem is that with the 'camera tilt' method, the image sensor is moving, relative to the fixed camera structure. This presents extreme difficulties in routing electrical connections from the image sensor to the fixed structure of the camera, and onto the mobile phone motherboard. Solutions to this centre around flexible printed circuits (FPC's) to route connections, but the FPC design remains challenging, owing to the large number of connections, and the high data rates. Therefore, it is highly desirable for the image sensor to remain stationary and fixed.

The second problem is that the camera tilt method implies that there is a camera structure comprising as a minimum the lens and image sensor, with support structures that must tilt inside a surrounding support structure. Because the camera has a finite footprint, the tilt of the camera means that the camera thickness (height) of the OIS camera must be greater than for an equivalent camera without OIS. In mobile phones, it is highly desirable to minimise the camera height.

The third problem, is that by tilting the whole camera, it is difficult to package the tilting actuators without increasing the footprint of the camera over that of the camera without OIS.

Accordingly, in this example, the lens element 2 is moved linearly in two orthogonal directions, both perpendicular to the optical axis O which may be termed "shift" or "OIS-shift". The resulting image compensation does not entirely reverse the effects of user handshake, but the performance is deemed sufficiently good, given the constraints described above, and in particular allows the size of the camera apparatus 1 to be reduced as compared to an apparatus using tilt.

Figure 2:
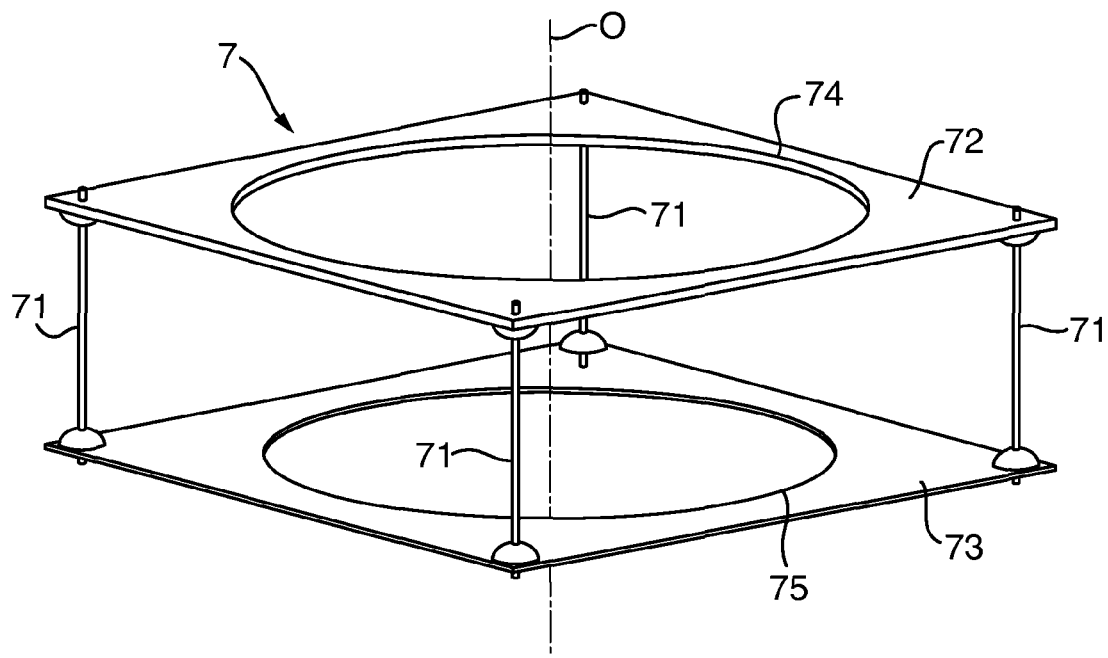
FIG. 2 is a perspective view of the suspension system of the camera apparatus.

The suspension system 7 is shown in isolation in FIG. 2 and arranged as follows.

The suspension system 7 comprises four beams 71 connected between a support plate 72 that forms part of the support structure 4 and a lens plate 73 that forms part of the lens element 2 and is connected to the rear end of the lens carrier 21 as shown in FIG. 1. The four beams 71 extend parallel to each other and to the optical axis O, and therefore extend perpendicular to the orthogonal directions in which the lens element 2 moves, although they could extend at a non-perpendicular angle, provided that they are transverse to the orthogonal directions.

The beams 71 are fixed to each of the support plate 72 and the lens plate 73 in a manner that the four beams 71 cannot rotate, for example by being soldered.

The beams 71 are positioned inside the support structure 4 and outside the lens carrier 21, the support plate 72 and the lens plate 73 having the same construction including respective apertures 74 and 75 aligned with the optical axis O to accommodate the lens element 2 and allow the passage of light to the image sensor 6. The beams 71 are equally spaced around the optical axis O, one at each corner of the camera apparatus 1

The beams 71 thereby support the lens element 2 on the support structure 4 in said manner allowing movement of the lens element 2 relative to the support structure 4 in two orthogonal directions perpendicular to the optical axis O simply by means of the beams 71 bending, in particular in an S-shape. Conversely, the beams 71 resist movement along the optical axis O. The beams 71 may have any construction that provides the desired compliance perpendicular to the optical axis O, typically being formed by wires, for example metal wires.

In general, the suspension system 7 could have any alternative construction that allows movement of the lens element 2 relative to the support structure 4 in any direction perpendicular to the optical axis O, whilst resisting movement along the optical axis O.

Figure 3:
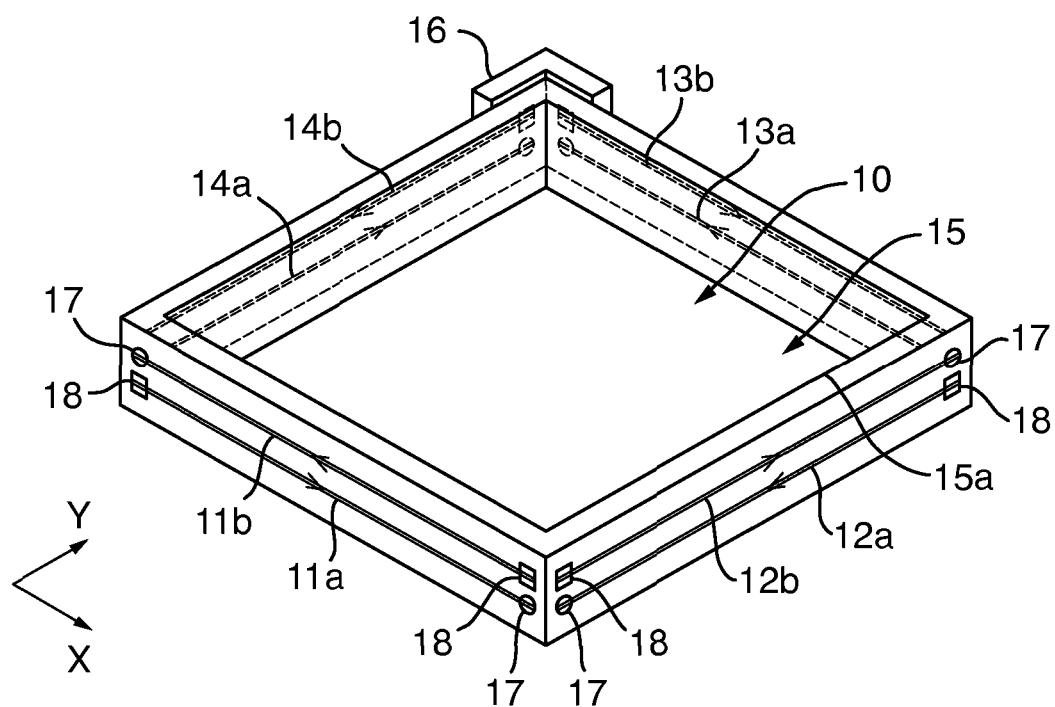
FIG. 3 is a perspective view of the arrangement of SMA actuator wires in the camera apparatus.

Movement of the lens element 2 is driven by an actuator arrangement 10 shown in FIG. 3, as will now be described.

The actuator arrangement 10 comprises four pairs of SMA actuator wires 11a, 11b to 14a, 14b connected at their ends to a movable platform 15 and to support blocks 16. In FIG. 3, two of the pairs of SMA actuator wires 13a, 13b and 14a, 14b are hidden from view but are shown in dotted outline to indicate their locations. The movable platform 15 forms part of the lens element 2 and is mounted to the rear of the lens plate 73 as shown in FIG. 1. As shown in FIG. 3, the movable platform 15 has a square outer profile with a central aperture 15a to allow the passage of light to the image sensor 6. A support block 16 is arranged outside each corner of the movable element 15. Only one of the support blocks 16 is shown in FIG. 3, to avoid obscuring the rest of the drawing, but three further identical support blocks 16 are in fact also present at the corners of the movable platform 15. The support blocks 16 form part of the support structure 4 and are mounted to the base 5. In this manner, the four pairs of SMA actuator wires 11a, 11b to 14a, 14b are connected at their ends to the lens element 2 and the support structure 4.

The four pairs of SMA actuator wires 11a, 11b to 14a, 14b have the following arrangement around the outside of the movable platform 15. One of the pairs of SMA actuator wires 11a, 11b to 14a, 14b is arranged on each of the four sides of the movable platform 15, with each individual SMA actuator wire 11a, 11b to 14a, 14b extending perpendicular to the optical axis O, first and third pairs of SMA actuator wires 11a, 11b and 13a, 13b extending along axis X and second and fourth pairs of SMA actuator wires 12a, 12b and 14a, 14b extending along axis Y. The SMA actuator wires 11a, 11b to 14a, 14b all have the same length and have 4-fold rotational symmetry as viewed along the optical axis O. This arrangement simplifies the control, which is described below, as well as providing convenient packaging around the lens element 2 without obscuring the optics. However, this arrangement is not essential, and in general other arrangements of SMA actuator wires could be provided. For example, in other arrangements the SMA actuator wires might extend transverse to notional radii of the optical axis O as viewed along the optical axis O, without being perpendicular as in this arrangement.

Also, the two SMA actuator wires 11a, 11b to 14a, 14b within each of the pairs are offset in a direction along the optical axis O and overlie one another as viewed along the optical axis O. Each of the pairs of SMA actuator wires 11a, 11b to 14a, 14b is disposed at the same position along the optical axis O. These features have the advantages of minimising the size of the actuator arrangement 10 along the optical axis O and of tending to reduce the torques applied to the lens element 2 and hence reducing the requirement on the suspension system 7 to resist tilting. However, these features are not essential and in general the two SMA actuator wires 11a, 11b to 14a, 14b within each of the pairs may be disposed at different distances from the optical axis O and the SMA actuator wires 11a, 11b to 14a, 14b may be disposed at different distances along the optical axis O and still provide the desired movement perpendicular thereto.

The actuator arrangement 10 can be made very compact. The SMA actuator wires 11a, 11b to 14a, 14b are themselves very thin, typically of the order of 25 μm in diameter, to ensure rapid heating and cooling. The arrangement 10 of SMA actuator wires 11a, 11b to 14a, 14b barely adds to the footprint of the actuator arrangement 10 and may be made very thin in the direction along the optical axis O, since the SMA actuator wires 11a, 11b to 14a, 14b are laid essentially in a plane perpendicular to the optical axis O in which they remain in operation. The height along the optical axis then depends on the thickness of the other components such as the crimping members 17 and 18 described below and the height necessary to allow manufacture.

Each of the SMA actuator wires 11a, 11b to 14a, 14b is held in tension, thereby applying a force between the movable platform 15 and the support block 16 in a direction perpendicular to the optical axis O. Although the SMA actuator wires 11a, 11b to 14a, 14b are described as extending "perpendicular" to the optical axis O, this does not imply an overly strict requirement and merely means that the angle is sufficiently close to perpendicular to provide a bulk movement of the lens element 2 perpendicular to the optical axis O suitable for shake correction, so there may be a slight inclination with respect to a plane perpendicular to the optical axis O.

The SMA actuator wires 11a, 11b to 14a, 14b are connected at one end to the movable platform 15 by respective crimping members 17 and at the other end to the support block 16 by crimping members 18. The crimping members 17 and 18 crimp the wire to hold it mechanically, optionally strengthened by the use of adhesive. The crimping members 17 and 18 also provide an electrical connection to the SMA actuator wires 11a, 11b to 14a, 14b. However, any other suitable means for connecting the SMA actuator wires 11a, 11b to 14a, 14b may alternatively be used.

SMA material has the property that on heating it undergoes a solid-state phase change which causes the SMA material to contract. At low temperatures the SMA material enters the Martensite phase. At high temperatures the SMA enters the Austenite phase which induces a deformation causing the SMA material to contract. The phase change occurs over a range of temperature due to the statistical spread of transition temperature in the SMA crystal structure. Thus heating of the SMA actuator wires 11a, 11b to 14a, 14b causes them to decrease in length. The SMA actuator wires 11a, 11b to 14a, 14b may be made of any suitable SMA material, for example Nitinol or another Titanium-alloy SMA material. Advantageously, the material composition and pre-treatment of the SMA actuator wires 11a, 11b to 14a, 14b is chosen to provide phase change over a range of temperature that is above the expected ambient temperature during normal operation and as wide as possible to maximise the degree of positional control.

On heating of one of the SMA actuator wires 11a, 11b to 14a, 14b, the stress therein increases and it contracts. This causes movement of the lens element 2. A range of movement occurs as the temperature of the SMA increases over the range of temperature in which there occurs the transition of the SMA material from the Martensite phase to the Austenite phase. Conversely, on cooling of one of the SMA actuator wires 11a, 11b to 14a, 14b so that the stress therein decreases, and it expands under the force from opposing ones of the SMA actuator wires 11a, 11b to 14a, 14b. This allows the lens element 2 to move in the opposite direction.

The position of the lens element 2 relative to the support structure 4 perpendicular to the optical axis O is controlled by selectively varying the temperature of the SMA actuator wires 11a, 11b to 14a, 14b. This is achieved by passing through SMA actuator wires 11a, 11b to 14a, 14b selective drive currents that provides resistive heating. Heating is provided directly by the drive current. Cooling is provided by reducing or ceasing the drive current to allow the lens element 2 to cool by conduction to its surroundings.

The SMA actuator wires 11a, 11b to 14a, 14b are selectively operable to drive movement of the lens element 2 in any direction perpendicular to the optical axis O, as follows. The SMA actuator wires 11a, 11b to 14a, 14b of each pair are connected in opposition to apply a force to the lens element 2 in opposite directions, as follows. Taking the first pair of SMA actuator wires 11a, 11b as an example, the crimping members 17 and 18 connected to the lens element 2 and support structure 4, respectively, are at opposite ends as viewed in FIG. 3. Thus, the SMA actuator wires 11a, 11b apply a force to the lens element 2 in opposite directions along axis X, as viewed in FIG. 3 being from right to left for SMA actuator wire 11a and from left to right for SMA actuator wire 11b.

Accordingly, the first pair of SMA actuator wires 11a, 11b may drive movement of the lens element 2 in either direction along axis X by causing differential contraction of the SMA actuator wires 11a, 11b. The other pairs of SMA actuator wires 12a, 12b to 14a, 14b have a similar arrangement, so that the third pair of SMA actuator wires 13a, 13b may also drive movement of the lens element 2 in either direction along axis X and the second and fourth pairs of SMA actuator wires 12a, 12b and 14a, 14b may each drive movement of the lens element 2 in either direction along axis Y.

As a result of the arrangement around the optical axis O, the pairs of SMA actuator wires 11a, 11b to 14a, 14b may in combination drive the lens element 2 in any direction. Movement along the X axis is driven by the first and third pairs of SMA actuators 11a, 11b and 13a, 13b. Movement along the Y axis is driven by the second and fourth pairs of SMA actuator wires 12a, 12b and 14a, 14b. Movement in other directions may be driven by a combination of actuation of the pairs of the SMA actuator wires 11a, 11b to 14a, 14b to provide a linear combination of movement along axes X and Y.

Furthermore, as a result of the four-fold rotational symmetry, the torques around the optical axis O generated in pairs of SMA actuator wires 11a, 11b to 14a, 14b tend to balance one another. That is, the forces generated by the first and third pairs of SMA actuators 11a, 11b and 13a, 13b create torques in opposite senses around the optical axis O that tend to balance, and similarly the forces generated by the second and fourth pairs of SMA actuator wires 12a, 12b and 14a, 14b create torques in opposite senses around the optical axis O that tend to balance.

This reduction of torque around the optical axis O reduces the tendency for the lens element 2 to rotate around the optical axis O. The reduction or balancing of torques around the primary axis reduces the constraints on the suspension system 7. In fact, in some embodiments, the constraints may be reduced to the extent that no suspension system is needed, and the lens element 2 is instead supported by the SMA actuator wires 11a, 11b to 14a, 14b themselves.

Figure 4:
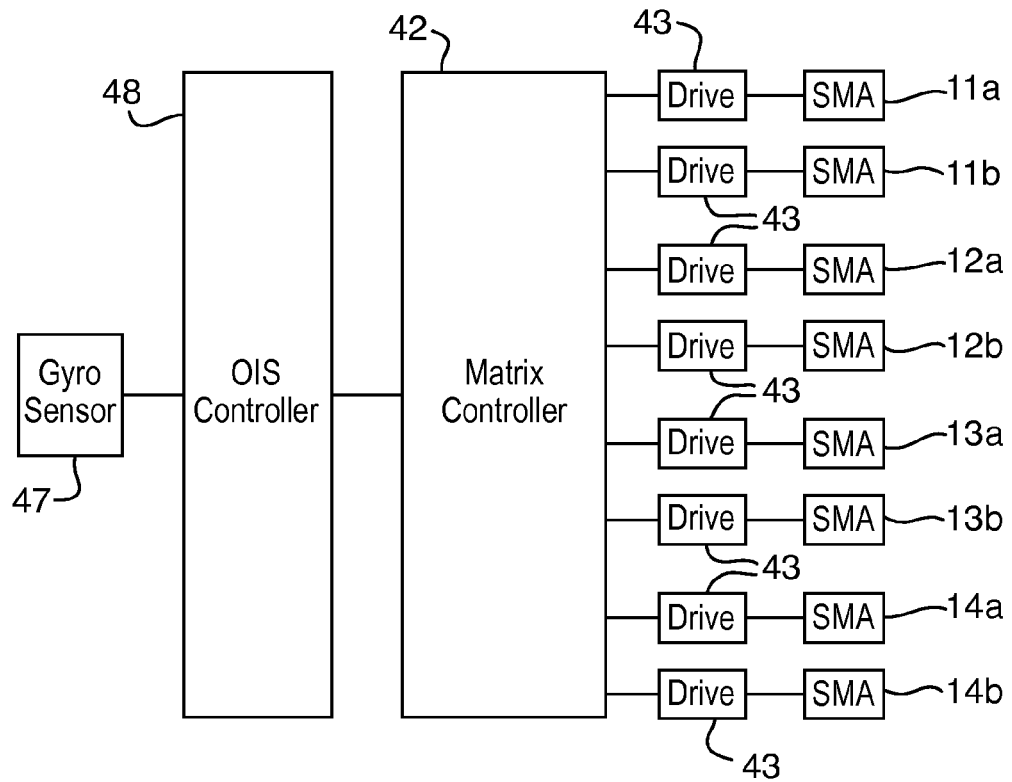
FIG. 4 is a diagram of a control circuit for the SMA actuator wires.
Figure 5:
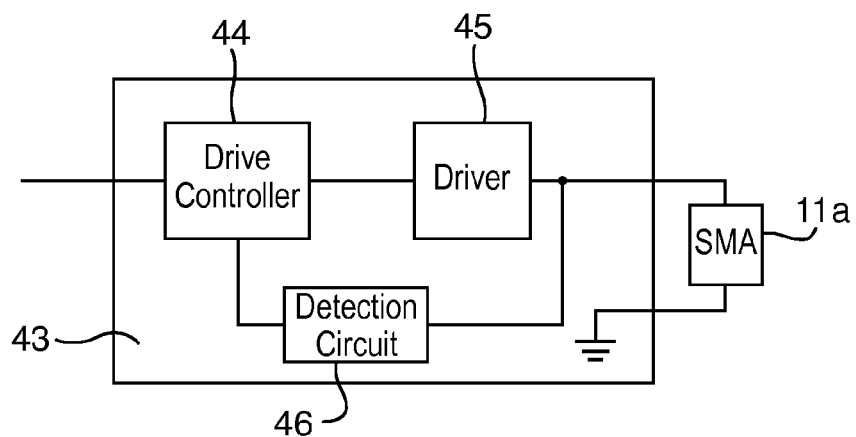
FIG. 5 is a diagram of a drive circuit of the control circuit.

The control of the SMA actuator wires 11a, 11b to 14a, 14b is effected by the control circuit 40 shown in FIG. 4 which generates drive signals for each of the SMA actuator wires 11a, 11b to 14a, 14b and is arranged as follows.

The control circuit 40 includes a gyroscope sensor 47 that outputs a signal representative of the angular velocity of the lens element 2, thereby acting as a vibration sensor that detects the vibrations that the camera apparatus 1 is experiencing. The gyroscope sensor 47 is typically a pair of miniature gyroscopes, for detecting vibration around two axes perpendicular to each other and the optical axis O, although in general larger numbers of gyroscopes or other types of vibration sensor could be used.

The output signals from the gyroscope sensor 47 are supplied to an OIS controller 48 that may be implemented in a processor. The OIS controller 48 derives movement signals that represent the movement of the lens element 2 needed to compensate for the movement of the camera apparatus 1 as a whole, and therefore stabilise the image sensed by the image sensor 6. As the gyroscope sensor 47 is mounted on the support structure 4 the output signals are representative of the vibration of the support structure 4. OIS is effected by moving the lens element 2 laterally in opposition. Accordingly, the OIS controller 48 generates movement signals providing a desired movement which is opposite to the actual tilt as measured by the gyroscope sensor 47. The OIS controller 48 may process the output signals from the gyroscope sensor 47, for example by filtering them, prior to generating the movement signals.

The movement signals 41 from the OIS controller 48 are supplied to a matrix controller 42 that may be implemented in a processor or in hardware. Although the matrix controller 42 and the OIS controller 48 are illustrated as separate components for ease of understanding, they may be implemented in a common processor.

The matrix controller 42 generates a control signal for each of the SMA actuator wires 11a, 11b to 14a, 14b on the basis of the movement signals. This uses a matrix calculation that relates the necessary contraction of each one of the SMA actuator wires 11a, 11b to 14a, 14b to achieve the desired movement. The matrix calculation is further arranged to generate control signals that cause the SMA actuator wires to provide no net component of torque around the optical axis O. Thus the matrix calculation represents the actual arrangement of the SMA actuator wires 11a, 11b to 14a, 14b in the camera apparatus 1. With the symmetrical arrangement shown in FIG. 3, the matrix calculation is straightforward because each of the SMA actuator wires 11a, 11b to 14a, 14b generates a force along one of the axes X and Y, but the matrix calculation may equally represent other, more complicated arrangements of SMA actuator wires.

Any desired movement has components in each of the directions X and Y in which movement is driven by the pairs of the SMA actuator wires 11a, 11b to 14a, 14b identified above. Thus, for each of those components of the desired movement represented by the movement signal, the control signals provide for differential contraction of those pairs of the SMA actuator wires 11a, 11b to 14a, 14b.

These control signals may be modified by various compensation algorithms to compensate for non-linear effects such as hysteresis in the SMA material.

Each one of the SMA actuator wires 11a, 11b to 14a, 14b is connected to a respective drive circuit 43 that is supplied by the matrix controller 42 with the control signal for the corresponding one of the SMA actuator wires 11a, 11b to 14a, 14b. The drive circuits 43 generate a drive signal in accordance with the control signal and supply the drive signal to the SMA actuator wire 11a, 11b to 14a, 14b. The drive circuits 43 have identical arrangement which is shown in FIG. 7 in respect of the first SMA actuator wire 11a and arranged as follows.

The drive circuit 43 includes a drive controller 44 that is supplied with the control signal from the matrix controller 42 and controls a driver 45 using resistance feedback. The drive controller 44 may be implemented in a processor. Although the matrix controller 42 and the drive controllers 44 are illustrated as separate components of ease of understanding, they may be implemented in a common processor.

The driver 45 is connected to supply the drive current to the SMA actuator wire 11a. The driver 45 may be a constant-voltage current source or a constant-current current source. For example, in the latter case the constant current might be of the order of 120 mA.

The drive circuit 43 further includes a detection circuit 46 arranged to detect the resistance of the SMA actuator wire 11a. In the case that the driver 45 is a constant-current current source, the detection circuit 46 may be a voltage detection circuit operable to detect the voltage across the SMA actuator wire 11a which is a measure of the resistance of the SMA actuator wire 1. In the case that the driver 45 is a constant-voltage current source, the detection circuit 46 may be a current detection circuit. For a higher degree of accuracy the detection circuit 46 may comprise a voltage detection circuit and a current detection circuit operable to detect both the voltage and current across the SMA actuator and to derive a measure of resistance as the ratio thereof.

The drive controller 44 is arranged to control the driver 45 to supply a pulse-width modulated current. The drive controller 44 receives the resistance measured by the detection circuit 46 and uses it as a feedback signal in a closed-loop control algorithm to control the PWM duty cycle of the driver 45 to actuate the SMA actuator wire 11a in accordance with the demand represented by the overall control signal. The closed-loop control may be proportional.

By using the electrical resistance of the SMA actuator wire 11a as a feedback parameter that relates to position, over the functional movement range the contraction and expansion of the SMA material is approximately linear with its electrical resistance. Non-linearities, including hysteresis and creep, occur to some extent. These may be ignored, but for better linearity, these may be accounted for in the closed-loop control algorithm.

The SMA actuator wires 11a, 11b to 14a, 14b may be provided with a sufficient speed of response to provide OIS. Typically each one of the SMA actuator wire 11a, 11b to 14a, 14b is proportionally driven so as to control the position over a frequency bandwidth up to 10 Hz, up to 20 Hz, or up to 30 Hz. A perceived drawback of SMA as an actuator is its slow response time. As an SMA material is thermally driven, the response time is limited by the temperature change achievable, being associated with thermal conductivity, specific heat capacity, and thermal mass.

Whilst heating of the SMA actuator wires 11a, 11b to 14a, 14b can be increased by increasing the power of the drive current, cooling is dependent on the thickness of the SMA actuator wires 11a, 11b to 14a, 14b. This thickness is selected to provide the desired response time during cooling. For example, if the SMA actuator wires 11a, 11b to 14a, 14b are of thickness 25 µm, being currently the thinnest available commercial material, the thermal response begins to roll off at 4 Hz. Based on analysis of the OIS function, the functional requirement is to provide movement compensation over a bandwidth of up to 30 Hz. However, the amplitude of response required drops markedly over the operating bandwidth, so as to only require less movement (say less than 10 µm at over 20 Hz). Surprisingly, in spite of the roll-off in SMA actuator wire response above 4 Hz, the SMA actuator wires 11a, 11b to 14a, 14b are still able to deliver the displacement requirements at 30 Hz, and so are able to successfully meet the actuation requirements of the OIS for miniature cameras.

Various modifications to the camera apparatus 1 described above are possible. In the above example, the actuator arrangement 10 comprises four pairs of SMA actuator wires 11a, 11b to 14a, 14b, but more generally could comprise any number N of pairs of SMA actuators, where N is three or more, and still achieve similar operation and advantages as described above mutatis mutandis. In the above example, the lens element 2 has a square shape as viewed along a primary axis P but more generally could have any shape. In the above example, the support structure 4 is illustrated schematically but could in general be any type of element suitable for supporting the lens element 2. More generally, the same type of actuator arrangement 10 may in general be applied to any type of movable element other than a lens element.

The invention claimed is:

1. An SMA actuation apparatus for moving a movable element relative to a support structure in any direction perpendicular to a notional primary axis, the SMA actuation apparatus comprising:
   a support structure;
   a movable element supported on the support structure in a manner allowing movement of the movable element relative to the support structure in any direction perpendicular to said primary axis; and
   N pairs of SMA actuator wires extending perpendicular to said primary axis, and extending transverse to respective notional radii extending from the primary axis, as viewed along the primary axis where N is three or more, the SMA actuator wires of each pair extending parallel to each other and being connected at their ends in tension to the movable element and the support structure in opposition so that they apply a force to the movable element in opposite directions, the pairs of SMA actuator wires being arranged around the movable element such that they are capable of being selectively driven to move the movable element in any direction perpendicular to said primary axis.

2. An apparatus according to claim 1, wherein the SMA actuation apparatus is a camera apparatus further comprising an image sensor fixed to the support structure, and the movable element comprises a camera lens element comprising one or more lenses arranged to focus an image on the image sensor, the primary axis being the optical axis of the camera lens element.

3. An apparatus according to claim 2, wherein the at least one lens has a diameter of at most 10 mm.

4. An apparatus according to claim 3, wherein the camera lens element comprises a lens carrier on which the one or more lenses are supported in a manner in which at least one of the one or more lenses is movable along the optical axis.

5. An apparatus according to claim 2, further comprising:
   a vibration sensor arranged to generate output signals representative of the vibration of the apparatus; and
   a control circuit arranged to generate drive signals for the SMA actuator wires in response to the output signals of the vibration sensor for stabilising the image sensed by the image sensor, and to supply the generated drive signals to the SMA actuator wires.

6. An apparatus according to claim 5, wherein the control circuit is arranged to generate drive signals that cause the SMA actuator wires provide no net component of torque around the primary axis.

7. An apparatus according to claim 1, wherein the pairs of SMA actuator wires are arranged around the outside of the movable element.

8. An apparatus according to claim 1, wherein the pairs of SMA actuator wires are arranged around the movable element with N-fold rotational symmetry as viewed along the primary axis.

9. An apparatus according to claim 1, wherein N is four.

10. An apparatus according to claim 1, wherein the SMA actuator wires of each pair overlie one another as viewed along the primary axis.

11. An apparatus according to claim 1, wherein the SMA actuator wires have the same length.

12. An apparatus according to claim 1, further comprising a suspension system supporting the movable element on the support structure in said manner allowing movement of the movable element relative to the support structure in any direction perpendicular to said primary axis, whilst resisting movement of the movable element relative to the support structure along the primary axis.

13. An apparatus according to claim 12, wherein the suspension system comprises a plurality of beams extending transverse to said two orthogonal directions.

14. An apparatus according to claim 13, wherein the beams extend parallel to the primary axis.

15. An apparatus according to claim 13, wherein the beams are formed by wires.

* * * * *